United States Patent
Ueno (10) Patent No.: US 11,866,141 B2
(45) Date of Patent: Jan. 9, 2024

(54) DEVICE, METHOD, AND PROGRAM FOR CONTROLLING SHIP BODY

(71) Applicant: FURUNO ELECTRIC CO., LTD., Nishinomiya (JP)

(72) Inventor: Hideki Ueno, Takarazuka (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 537 days.

(21) Appl. No.: 16/909,906

(22) Filed: Jun. 23, 2020

(65) Prior Publication Data
US 2020/0407034 A1 Dec. 31, 2020

(30) Foreign Application Priority Data
Jun. 27, 2019 (JP) .................... 2019-119450

(51) Int. Cl.
*B63H 21/21* (2006.01)
*G05D 1/00* (2006.01)

(52) U.S. Cl.
CPC ......... *B63H 21/213* (2013.01); *G05D 1/0061* (2013.01); *B63H 2021/216* (2013.01)

(58) Field of Classification Search
CPC ............ B63H 2021/216; B63H 21/213; G05D 1/0061
See application file for complete search history.

(56) References Cited

U.S. PATENT DOCUMENTS

| | | | |
|---|---|---|---|
| 5,268,844 A | 12/1993 | Carver et al. | |
| 6,884,128 B2 | 4/2005 | Okuyama et al. | |
| 8,340,847 B2 * | 12/2012 | Sako | B63H 21/21 |
| | | | 701/21 |
| 8,943,988 B1 | 2/2015 | Guglielmo et al. | |
| 9,377,780 B1 | 6/2016 | Arbuckle et al. | |
| 9,718,527 B2 | 8/2017 | Ito | |
| 9,950,777 B2 | 4/2018 | Kishimoto et al. | |

(Continued)

FOREIGN PATENT DOCUMENTS

| | | |
|---|---|---|
| CN | 109116838 A | 1/2019 |
| EP | 2 246 765 A1 | 11/2010 |

(Continued)

OTHER PUBLICATIONS

The extended European search report issued by the European Patent Office dated Nov. 30, 2020, which corresponds to European Patent Application No. 20181370.6-1015 and is related to U.S. Appl. No. 16/909,906.

(Continued)

*Primary Examiner* — Peter D Nolan
*Assistant Examiner* — Luke Huynh
(74) *Attorney, Agent, or Firm* — Studebaker & Brackett PC (57) ABSTRACT

A ship body control device is provided, which includes a control lever having a neutral position, and processing circuitry. When the control lever is moved during an automatic cruise, the processing circuitry executes a deceleration control from a speed of a ship body during the automatic cruise, and when the position of the control lever is in agreement with a position for changing to a manual cruise, the processing circuitry changes the automatic cruise to the manual cruise at a rotating speed of an engine according to the position for changing to the manual cruise.

12 Claims, 6 Drawing Sheets

(56) References Cited

U.S. PATENT DOCUMENTS

| | | |
|---|---|---|
| 10,167,798 B1 | 1/2019 | Van Camp et al. |
| 10,723,431 B1 | 7/2020 | Przybyl et al. |
| 11,188,080 B2 | 11/2021 | Akuzawa et al. |
| 2004/0181322 A1 | 9/2004 | Okuyama |
| 2004/0242091 A1 | 12/2004 | Okuyama et al. |
| 2007/0134092 A1* | 6/2007 | Rosenkranz ........... B63H 21/22 416/1 |
| 2007/0293103 A1 | 12/2007 | Kinoshita et al. |
| 2009/0105962 A1 | 4/2009 | Woolf et al. |
| 2009/0288585 A1 | 11/2009 | Mitsui et al. |
| 2010/0121505 A1 | 5/2010 | Yamazaki et al. |
| 2012/0010766 A1 | 1/2012 | Sako et al. |
| 2015/0089427 A1 | 3/2015 | Akuzawa |
| 2016/0229511 A1 | 8/2016 | Kishimoto et al. |
| 2016/0280351 A1 | 9/2016 | Ito |
| 2017/0137103 A1* | 5/2017 | Ito ......................... B63H 20/00 |
| 2017/0277189 A1 | 9/2017 | Johnson et al. |
| 2017/0285645 A1 | 10/2017 | Nakagawa |
| 2017/0349258 A1 | 12/2017 | Kishimoto et al. |
| 2017/0365175 A1 | 12/2017 | Harnett |
| 2018/0015994 A1 | 1/2018 | Kishimoto et al. |
| 2018/0334234 A1 | 11/2018 | Namba et al. |
| 2019/0039708 A1 | 2/2019 | Hayes et al. |
| 2019/0084662 A1 | 3/2019 | Wong et al. |
| 2019/0249906 A1 | 8/2019 | Wu et al. |
| 2019/0263483 A1 | 8/2019 | Li et al. |
| 2020/0407034 A1 | 12/2020 | Ueno |
| 2021/0078690 A1 | 3/2021 | Ueno |

FOREIGN PATENT DOCUMENTS

| | | |
|---|---|---|
| EP | 3173324 A1 | 5/2017 |
| EP | 3 214 523 A1 | 9/2017 |
| JP | S58-099198 U | 7/1983 |
| JP | H08-198185 A | 8/1996 |
| JP | H10-109693 A | 4/1998 |
| JP | 2004-034805 A | 2/2004 |
| JP | 2004-142537 A | 5/2004 |
| JP | 2004-142538 A | 5/2004 |
| JP | 2007-022422 A | 2/2007 |
| JP | 2008-155764 A | 7/2008 |
| JP | 2009-025860 A | 2/2009 |
| JP | 2011-235839 A | 11/2011 |
| JP | 2013-151241 A | 8/2013 |
| JP | 2014-024421 A | 2/2014 |
| JP | 2015-066979 A | 4/2015 |
| JP | 2016-144971 A | 8/2016 |
| JP | 2017-088111 A | 5/2017 |
| JP | 2017-178242 A | 10/2017 |
| JP | 2018-192976 A | 12/2018 |
| JP | 6513677 B2 | 5/2019 |
| KR | 10-2014-0080106 A | 6/2014 |
| KR | 10-2018-0044087 A | 5/2018 |
| WO | 2016/104030 A1 | 6/2016 |
| WO | 2016/104031 A1 | 6/2016 |
| WO | 2016/109832 A2 | 7/2016 |
| WO | 2018/100748 A1 | 6/2018 |
| WO | 2018/228670 A1 | 12/2018 |

OTHER PUBLICATIONS

The extended European search report issued by the European Patent Office dated Dec. 10, 2020, which corresponds to European Patent Application No. 20182258.2-1015 and is related to U.S. Appl. No. 16/909,906.

The extended European search report issued by the European Patent Office dated Feb. 26, 2021, which corresponds to European Patent Application No. 20195840.2-1015 and is related to U.S. Appl. No. 16/909,906.

Das et al., "Diesel Engine Control and Protection Monitoring using PID Controller", 2019 Innovations in Power and Advanced Computing Technologies (i-PACT), Mar. 22-23, 2019, pp. 1-6, IEEE.

Petratos et al., "A novel robust MPC based aircraft auto-throttle for performing 4D contract flights", 2013 9th Asian Control Conference (ASCC), Jun. 23-26, 2013, pp. 1-6, IEEE.

Schöley et al., "Application of a modified error governor to electronic throttle control", 2017 22nd International Conference on Methods and Models in Automation and Robotics (MMAR), Aug. 28-31, 2017, pp. 815-819, IEEE.

Lee et al., "Assessment of Energy Savings With Variable Speed Drives in Ship's Cooling Pumps", IEEE Transactions on Energy Conversion, vol. 30, No. 4, Jun. 1, 2015, pp. 1288-1298, IEEE.

Haifeng et al., "The Speed Control of Marine Main Engine", 2014 Sixth International Conference on Measuring Technology and Mechatronics Automation, Jan. 10-11, 2014, pp. 770-773, IEEE.

Jiang et al., "An Integrated Control Simulation System of Ship Motion and Main Propulsion", 2014 IEEE International Conference on Information and Automation (ICIA), Jul. 28-30, 2014, pp. 865-869, IEEE.

Oh et al., "System Identification of a Model Ship Using a Mechatronic System", IEEE/ASME Transactions on Mechatronics, vol. 15, No. 2, Jun. 16, 2009, pp. 316-320, IEEE.

Micheau et al., "Engine speed limiter for watercrafts", IEEE Transactions on Control Systems Technology, vol. 14, No. 3, Apr. 24, 2006, pp. 579-585, IEEE.

An Office Action mailed by the United States Patent and Trademark Office dated Oct. 17, 2022, which corresponds to U.S. Appl. No. 17/015,801, and is related to the present application.

The extended European search report issued by the European Patent Office dated Dec. 17, 2020, which corresponds to European Patent Application No. 20195841.0-1202 and is related to U.S. Appl. No. 16/909,906.

Communication pursuant to Article 94(3) EPC issued by the European Patent Office dated Dec. 23, 2021, which corresponds to European Patent Application No. 20 195 841.0-1202 and is related to U.S. Appl. No. 16/909,906.

An Office Action mailed by the United States Patent and Trademark Office dated Mar. 16, 2023, which corresponds to U.S. Appl. No. 16/909,978, and is related to the present application.

An Office Action mailed by the United States Patent and Trademark Office dated Jan. 31, 2023, which corresponds to U.S. Appl. No. 17/015,801, and is related to the present application.

An Office Action mailed by the United States Patent and Trademark Office dated Mar. 3, 2023, which corresponds to U.S. Appl. No. 17/018,521, and is related to the present application.

Notice of Allowance mailed by the United States Patent and Trademark Office dated Sep. 12, 2023, which corresponds to U.S. Appl. No. 17/018,521, and is related to the present application.

Communication pursuant to Article 94(3) EPC issued by the European Patent Office dated Sep. 14, 2023, which rresponds to European Patent Application No. 20181370.6-1009 and is related to the present application.

\* cited by examiner

DEVICE, METHOD, AND PROGRAM FOR CONTROLLING SHIP BODY

CROSS-REFERENCE TO RELATED APPLICATION(S)

The application claims priority under 35 U.S.C. § 119 to Japanese Patent Application No. 2019-119450, which was filed on Jun. 27, 2019, the entire disclosure of which is hereby incorporated by reference.

TECHNICAL FIELD

The present disclosure relates to a technology of a ship body control including a cruising speed of a ship body.

BACKGROUND

JP2004-142538A discloses a propulsion control device for a ship.

However, in the conventional ship body control, when changing from an automatic cruise to a manual cruise by a control lever, the ship's speed changes suddenly if a speed of the automatic cruise differs from a speed of the manual cruise.

SUMMARY

Therefore, one purpose of the present disclosure is to realize a ship body control which is capable of performing a change between an automatic cruise and a manual cruise, without a sudden speed change.

According to one aspect of the present disclosure, a ship body control device includes a control lever having a neutral position and an autopilot controller. When the control lever is moved during an automatic cruise, the autopilot controller executes a deceleration control from a speed of a ship body during the automatic cruise, and when the position of the control lever is in agreement with a position for changing to a manual cruise, the autopilot controller changes the automatic cruise to the manual cruise at a rotating speed of an engine (propelling force generator) according to the position for changing to the manual cruise.

With this configuration, when changing from the automatic cruise to the manual cruise, a rapid speed change can be reduced.

According to the present disclosure, the change between the automatic cruise and the manual cruise can be performed without a sudden speed change.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Figure 1:
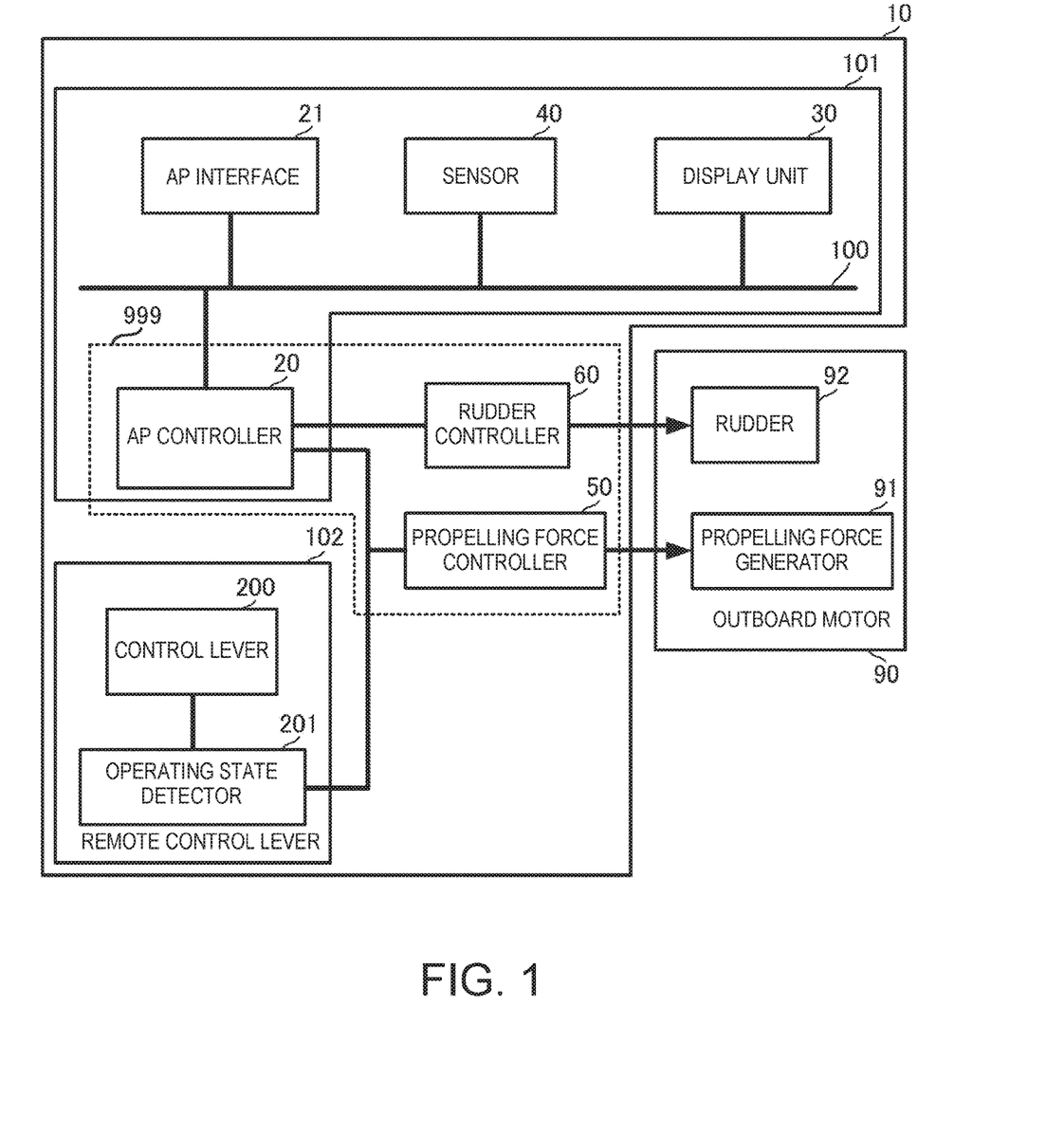
FIG. 1 is a functional block diagram illustrating a configuration of a ship body control device according to one embodiment of the present disclosure.

A ship body control device, a ship body control method, and a ship body control program according to one embodiment of the present disclosure are described with reference to the accompanying drawings. FIG. 1 is a functional block diagram illustrating a configuration of the ship body control device according to this embodiment of the present disclosure.

As illustrated in FIG. 1, a ship body control device 10 may include a main part 101, a remote control lever 102, a propelling force controller 50, and a rudder controller 60. The main part 101 may include an AP controller 20, an AP interface 21, a display unit 30, and a sensor 40. The remote control lever 102 may include a control lever 200 and an operating state detector 201.

The AP controller 20, the AP interface 21, the display unit 30, and the sensor 40 may be connected with each other via a data communication network 100 for a ship. The AP controller 20 may be connected with the propelling force controller 50, for example, via a propelling force communication network (e.g., CAN). The AP controller 20 may be connected with the rudder controller 60 via analog voltage or data communications.

A propelling force generator 91 may be connected to the propelling force controller 50. The rudder controller 60 may be connected to a rudder 92. The propelling force generator 91 and the rudder 92 may be provided, for example, to an outboard motor 90. The propelling force generator 91 and the rudder 92 may be provided, for example, to various kinds of propelling devices, such as an inboard motor and an inboard-outdrive motor.

(Configuration of Main Part 101)

The AP controller 20 is comprised of, for example, a processor, such as a CPU, and a memory. The memory may store a program executed by the AP controller 20. Moreover, the memory may be used during the calculation by the CPU. The AP controller 20 may correspond to an "autopilot controller" of the present disclosure. The AP controller 20 may perform various kinds of controls described later. The AP controller 20 may output instruction of the ship body control according to various kinds of control to the propelling force controller 50 and the rudder controller 60. The AP controller 20, the propelling force controller 50 and the rudder controller 60 may also be implemented as "processing circuitry" 999.

The AP interface 21 may be implemented by, for example, a touch panel, and a physical button or switch. The AP interface 21 may accept an operational input relevant to the autopilot control. The AP interface 21 may output the content of the operation to the AP controller 20.

The display unit 30 may be implemented by, for example, a liquid crystal panel. The display unit 30 may display, for example, whether it is under an automatic cruise or under a manual cruise according to an instruction from the AP controller 20. Moreover, the display unit 30 may display information relevant to the normal cruise of the autopilot according to an instruction from the AP controller 20. Note that, although the display unit 30 can be omitted, it is desirable that the display unit 30 is provided, and the existence of the display unit 30 may allow a user to easily grasp a cruising state.

The sensor 40 may measure measurement data, such as a speed and a bow direction of the ship. Note that the present disclosure may be applied to ships which typically travel on water or sea which are referred to as surface ships, and may also be applied to other types of ships including boats, dinghies, watercrafts, and vessels. The speed of the ship may be used for a propelling force control, and the bow direction may be used for a rudder control. For example, the sensor 40 may be implemented by a positioning sensor utilizing positioning signals of a GNSS (e.g., GPS) and an inertia sensor (e.g., an acceleration sensor and/or an angular velocity sensor). Note that, for the acquisition of the bow direction, the sensor 40 may be, for example, a magnetic sensor. Regarding the speed control of the ship, the sensor 40 may output the measurement data, such as the speed of the ship, to the AP controller 20.

The propelling force controller 50 may be implemented by, for example, a given electronic circuit. The propelling force controller 50 may generate a propelling force control signal according to the instruction from the AP controller 20, and output it to the propelling force generator 91. The propelling force generator 91 may be, for example, an engine for the ship. In this case, the propelling force control signal may be, for example, a signal which defines an amount of opening of an engine throttle (engine speed).

The rudder controller 60 may be implemented by, for example, a given electronic circuit and a physical control mechanism for a steering angle of a rudder. The rudder controller 60 may determine the steering angle of the rudder 92 according to the instruction from the AP controller 20.

(Configuration of Remote Control Lever 102)

Figure 2:
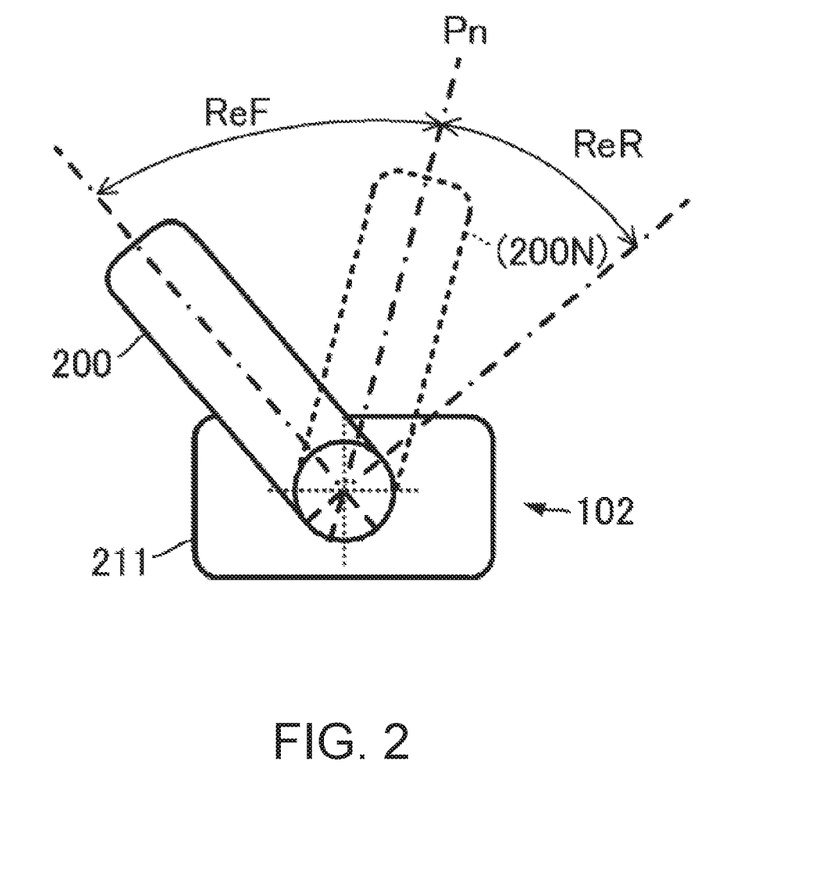
FIG. 2 is a side view schematically illustrating a structure of a remote control lever.

The remote control lever 102 may be disposed, for example, at a position of a body of the ship provided with the ship body control device 10 where a user can operate the remote control lever 102. FIG. 2 is a side view schematically illustrating a structure of the remote control lever. The remote control lever 102 may include a pillar-shaped control lever 200 and a casing 211. The operating state detector 201 and a transmitter 202 may be attached to the casing 211.

The control lever 200 may be attached to the casing 211 in a state where one end is a fixed end and the other end is rotatable. A specific position in this rotating direction may be set as a neutral position Pn. Moreover, with respect to this neutral position Pn, one side in the rotating direction may be a forward range ReF and the other side in the rotating direction may be a reverse range ReR.

The operating state detector 201 may be implemented by a sensor etc. The operating state detector 201 may detect, for example, an angle between the neutral position Pn and current position of the control lever 200, as an operating state of the control lever 200.

The detection of the operating state by the operating state detector 201 and a transmission of the operation information from the transmitter 202 may be sequentially performed at a given time interval.

The operating state detector 201 may output the detected operating state (angle) of the control lever to the propelling force controller 50. The AP controller 20 may receive this operating state.

With such a configuration, the ship body control device 10 may change between the automatic cruise and the manual cruise, as follows. Note that, below, although a ship speed control is described concretely and description of a steering angle control is omitted, the steering angle control may be suitably performed as needed, as well as the ship speed control.

(Basic Control of Manual Cruise)

The propelling force controller 50 may execute the following control according to the operating state from the operating state detector 201 when the manual cruise is set. The AP controller 20 may receive this operating state.

The propelling force controller 50 may control the propelling force generator 91 so that it does not generate a propelling force, when the control lever 200N is at the neutral position Pn as illustrated by a broken line in FIG. 2. Moreover, the propelling force controller 50 may control the propelling force generator 91 so that it generates a forward propelling force, when the control lever 200 is in the forward range ReF as illustrated by a solid line in FIG. 2. Here, the propelling force controller 50 may determine a rotating speed of the propelling force generator 91 according to the rotating angle of the control lever 200 from the neutral position Pn. In detail, the propelling force controller 50 may control the propelling force generator 91 so that the rotating speed becomes faster as the rotating angle increases.

Note that, although not illustrated, if the control lever 200 is in the reverse range ReR, the propelling force controller 50 may control the propelling force generator 91 so that it generates a reverse propelling force.

(First Mode of Change Between Automatic Cruise and Manual Cruise)

Figure 3A:
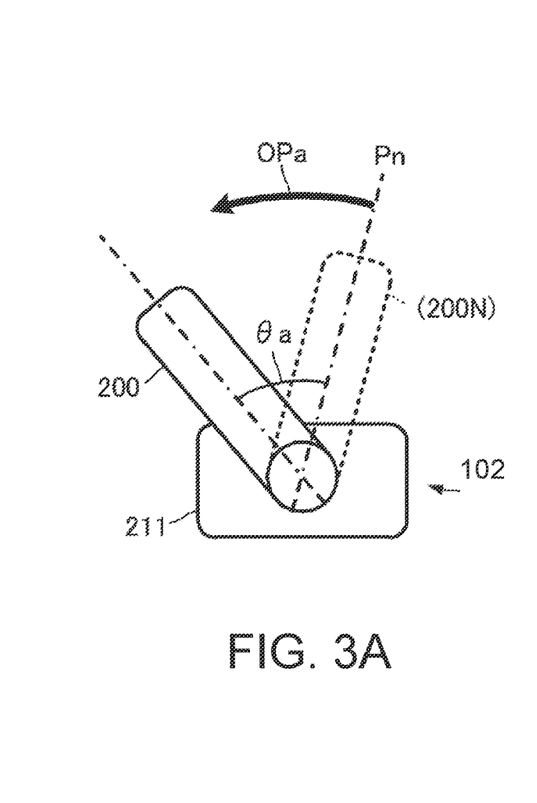
FIGS. 3A, 3B, and 3C are views illustrating a concept of a first mode of a change between an automatic cruise and a manual cruise.
Figure 3B:
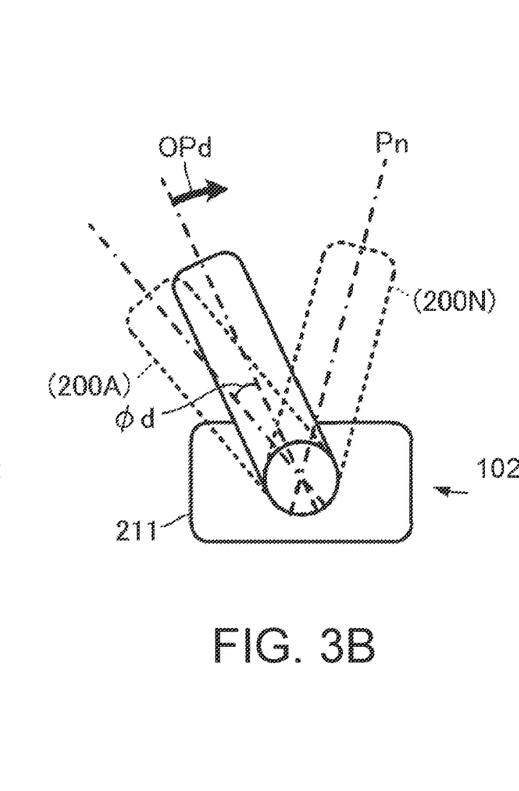
Figure 3C:
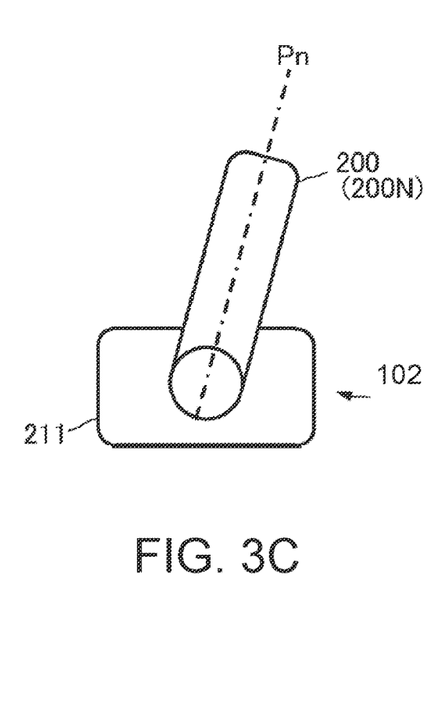

FIGS. 3A, 3B, and 3C are views illustrating a concept of a first mode of the change between the automatic cruise and the manual cruise. The operating state of the control lever is different in FIGS. 3A, 3B, and 3C.

(Change from Manual Cruise to Automatic Cruise)

When the control lever 200 is rotated into the forward range ReF (see FIG. 2) as illustrated by an arrow OPa in FIG. 3A, the propelling force controller 50 may execute a forward control at a rotating speed according to a rotating angle θa, as the manual cruise state described above. Here, the AP controller 20 may receive the operating state of the control lever.

Next, when the operation of the automatic cruise is inputted into the AP interface 21, the AP controller 20 may detect this operation and acquire the right of control of the propelling force controller 50. Thus, the ship body control device 10 may shift the control mode from the manual cruise to the automatic cruise.

The AP controller 20 may start the control of the automatic cruise by using the rotating speed according to the rotating angle θa as an initial value. During the automatic cruise, the AP controller 20 may give a control instruction to the propelling force controller 50 so that a given automatic cruising speed is maintained. Alternatively, the AP controller 20 may acquire from the sensor 40 a speed of the ship when the control mode shifts from the manual cruise to the automatic cruise. Then, the AP controller 20 may give a control instruction to the propelling force controller 50 so that the automatic cruising speed is kept constant, by using the speed as an initial value.

(Change from Automatic Cruise to Deceleration Control)

As illustrated by an arrow OPd in FIG. 3B, the control lever 200 may be rotated from the position at the start of the automatic cruise (a control lever 200A in FIG. 3B). The AP controller 20 may sequentially acquire the operating state detected by the operating state detector 201, and detect a changed angle (amount of movement) φd of the rotating angle by this rotation. The AP controller 20 may issue an instruction of a deceleration control to the propelling force controller 50, when the changed angle φd is more than a threshold for starting the deceleration control. In detail, for example, the AP controller 20 may issue the instruction of the deceleration control so as to gradually reduce the rotating speed. Here, the AP controller 20 may issue the instruction of the deceleration control so that a deceleration rate (e.g., a decreasing rate of the rotating speed) becomes constant. Thus, the ship slows down gradually.

(Change from Deceleration Control to Manual Cruise (Resume to Manual Cruise))

As illustrated in FIG. 3C, the control lever 200 may be resumed to the neutral position Pn. The AP controller 20 may sequentially acquire the operating state detected by the operating state detector 201, and detect that the control lever 200 reaches the neutral position Pn (the rotating angle is 0). The AP controller 20 may end the deceleration control by using this detection as a trigger, and change the control mode to the manual cruise. That is, the AP controller 20 may discard the right of control of the propelling force controller 50, and the propelling force controller 50 may control the propelling force generator 91 according to the operating state from the operating state detector 201. After that, the propelling force controller 50 and the AP controller 20 may resume the manual control state described above. Here, the propelling force controller 50 may resume the manual control from the state where the rotating speed is 0 (i.e., the neutral state). Note that the resuming to the manual control may also be possible by accepting a resuming operation to the manual control by the AP interface 21.

By such a control, the ship body control device 10 can reduce a rapid speed change, when changing from the automatic cruise to the manual cruise. Therefore, the ship body control device 10 can suitably change the mode from the automatic cruise to the manual cruise.

Figure 4:
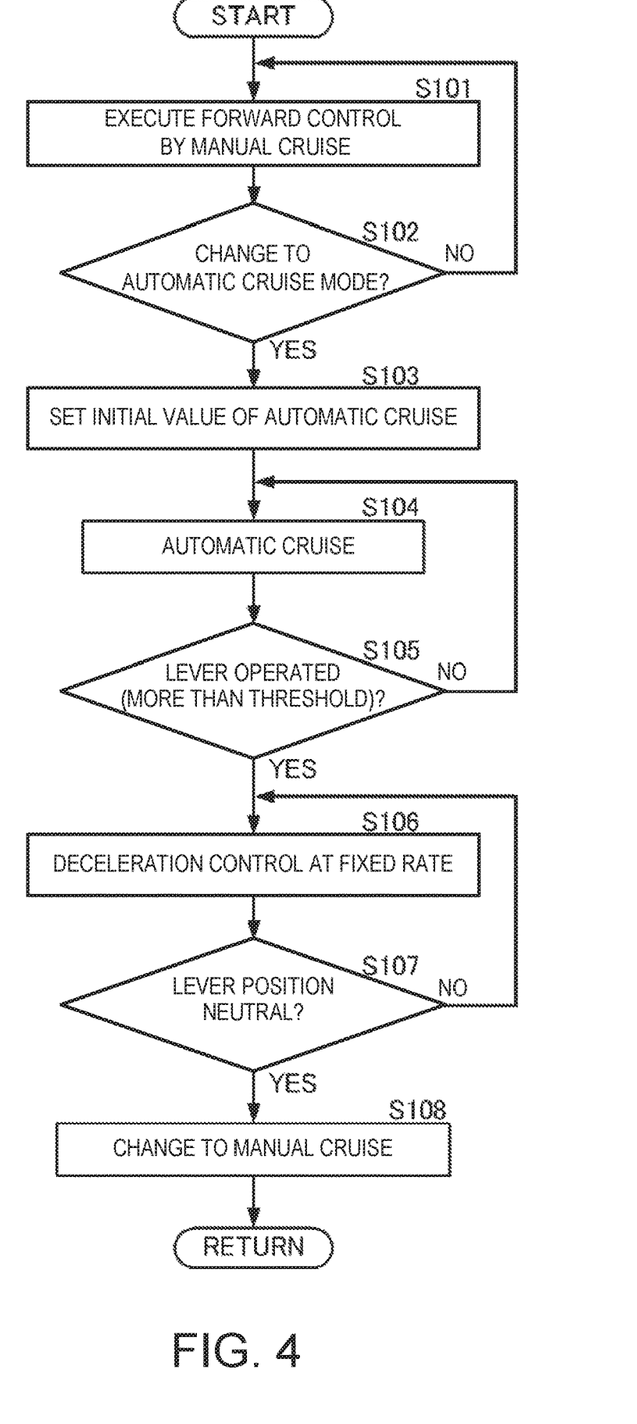
FIG. 4 is a flowchart of the first mode of the change between the automatic cruise and the manual cruise.

The above-described control may be implemented by, for example, the following method (program). FIG. 4 is a flowchart of the first mode of the change between the automatic cruise and the manual cruise. Note that, although the detection of the operation of the control lever 200 by the AP controller 20 uses the operating state detected by the operating state detector 201 as described above, description thereof is omitted below.

The propelling force controller 50 may execute the forward control by the manual cruise based on the operating state of the control lever 200 (Step S101).

If the AP controller 20 accepts the change to the automatic cruise by the AP interface 21 (Step S102: YES), it may then acquire the right of control of the propelling force controller 50, and perform the change to the automatic cruise. Note that, if it does not accept the change to the automatic cruise (Step S102: NO), it may continue the manual cruise (Step S101).

When the AP controller 20 shifts to the automatic cruise, it may start the automatic cruise control by using the rotating speed according to the operating state at this moment as an initial value (Step S103). Then, the AP controller 20 may issue a control instruction of the automatic cruise so that the ship cruises at a fixed speed (automatic cruising speed) (Step S104). Note that the AP controller 20 may fix the rotating speed, instead of the ship speed. Moreover, the user can arbitrarily set the speed and the rotating speed during the automatic cruise, for example, through the AP interface 21.

If the AP controller 20 detects the changed angle φd during the automatic cruise and detects that the changed angle φd becomes more than the threshold for starting the deceleration control (Step S105: YES), it may shift to the deceleration control (Step S106). Here, the AP controller 20 may execute the deceleration control at a fixed rate. By executing the deceleration control at the fixed rate, the ship can achieve a stable deceleration.

If the position of the control lever 200 is fixed or the changed angle φd does not reach the threshold for starting the deceleration control (Step S105: NO), the AP controller 20 may continue the automatic cruise (Step S104).

Thus, the AP controller 20 may set the threshold of the changed angle φd for the start of the deceleration control. Therefore, the AP controller 20 can reduce an erroneous determination of the change from the automatic cruise at the fixed ship speed to the deceleration control.

Until the AP controller 20 detects that the control lever 200 is at the neutral position Pn (Step S107: NO), it may maintain the deceleration control (Step S106).

If the AP controller 20 detects that the control lever 200 is at the neutral position Pn (Step S107: YES), it may end the deceleration control to discard the right of control of the propelling force controller 50, and may change the mode to the manual cruise (Step S108). Here, the AP controller 20 may discard the right of control of the propelling force controller 50, while setting the rotating speed as 0.

(Second Mode of Change Between Automatic Cruise and Manual Cruise)

Figure 5A:
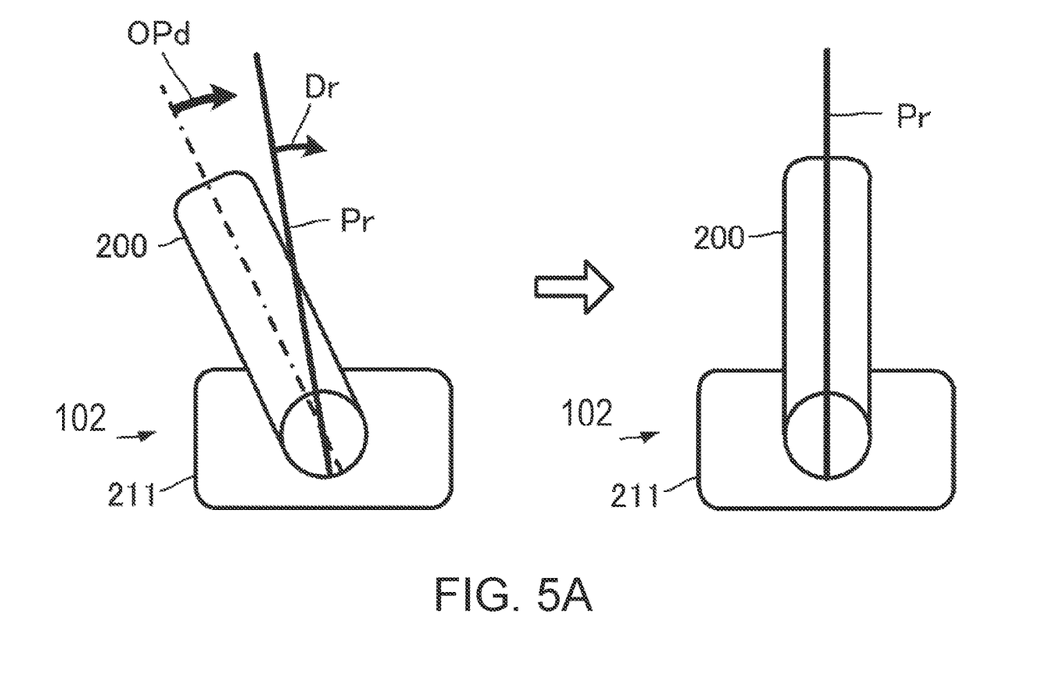
FIGS. 5A and 5B are views illustrating a concept of a second mode of a change from the automatic cruise to the manual cruise.
Figure 5B:
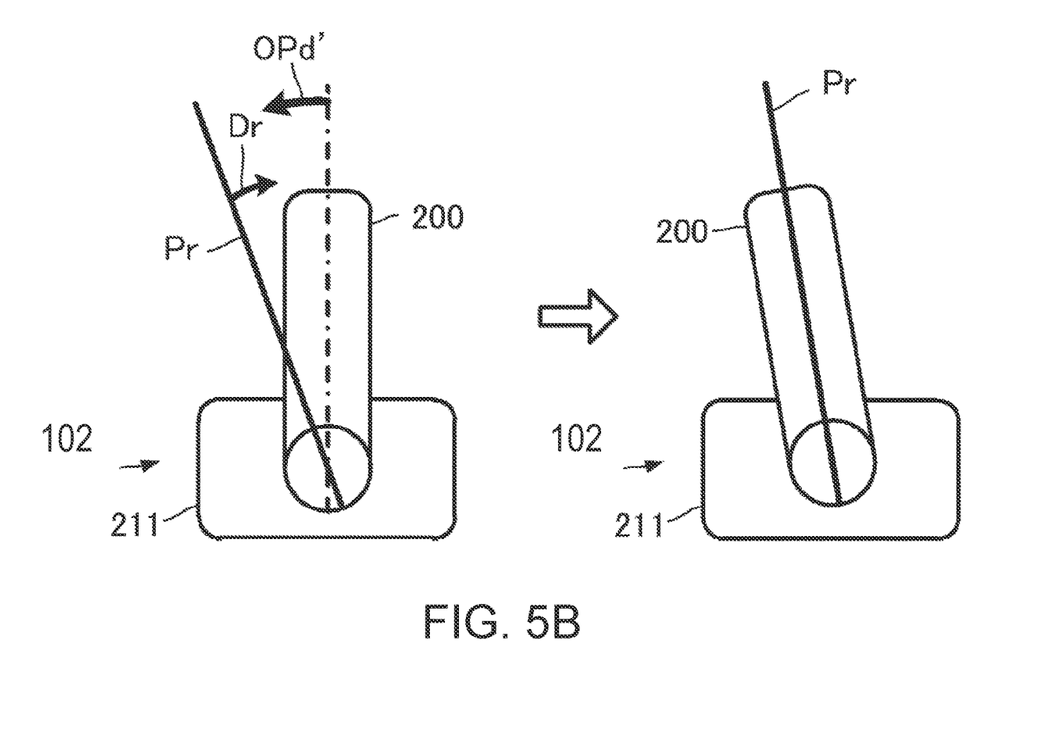

FIGS. 5A and 5B are views illustrating a concept of a second mode of a change from the automatic cruise to the manual cruise. FIGS. 5A and 5B differ in the operating direction of the control lever when changing to the manual cruise. Note that, also in the second mode, the change from the manual cruise to the automatic cruise and the change from the automatic cruise to the deceleration control are similar to those of the first mode, and therefore, description thereof is omitted.

(Change from Deceleration Control to Manual Cruise #1)

In the mode illustrated in FIG. 5A, the position of the control lever 200 is not changed largely at the start of the deceleration control. Thus, at the start of the deceleration control, the deceleration may progress quicker than the case where the control lever 200 is resumed to the neutral position Pn. In this case, an angle between a virtual axis Pr of the control lever corresponding to the rotating speed which is dropped by the deceleration control and a neutral axis passing through the neutral position Pn may be smaller than an angle between the axis of the control lever 200 and the neutral axis.

By further executing the deceleration control, the virtual axis Pr may approach the neutral axis at a speed Dr. In this state, the control lever 200 may be rotated toward the neutral position Pn quicker than the speed Dr (see arrow OPd of FIG. 5A). By this operation, the axis of the control lever 200 may gradually approach the virtual axis Pr, and will be in agreement with the virtual axis Pr at a certain timing.

The AP controller 20 may sequentially calculate the changed angle according to the motion of the virtual axis Pr. The AP controller 20 may sequentially detect the changed angle φd of the control lever 200, and detect a coincidence of the changed angle according to the motion of the virtual axis with the changed angle φd of the control lever 200.

The AP controller 20 may change from the deceleration control to the manual cruise by using this detection of the coincidence as a trigger. During this change, the AP controller 20 may execute a control for setting the rotating speed according to the virtual axis Pr for the propelling force controller 50.

Thus, when changed to the manual cruise, the ship speed may not change rapidly. Therefore, the ship body control device 10 can suitably change the mode from the automatic cruise to the manual cruise through the deceleration control.

Moreover, in this control, the mode can be changed to the manual cruise, even if the control lever 200 is not resumed to the neutral position Pn. Therefore, the ship body control device 10 can be resumed to the manual cruise at the user's desired speed different from that in the neutral state.

(Change from Deceleration Control to Manual Cruise #2)

In the mode illustrated in FIG. 5B, the control lever 200 is changed largely at the start of the deceleration control. Thus, at the start of the deceleration control, the deceleration may progress slower than the case where the control lever 200 is resumed to the neutral position Pn. In this case, the angle between the virtual axis Pr of the control lever corresponding to the rotating speed which is dropped by the deceleration control and the neutral axis passing through the neutral position Pn may be larger than the angle of the axis of the control lever 200 and the neutral axis.

By further executing the deceleration control, the virtual axis Pr may approach the neutral axis at the speed Dr. In this state, the control lever 200 may be rotated the opposite side of the neutral position Pn, i.e., in a direction in which the ship moves forward faster in the forward range ReF (see an arrow OPd' in FIG. 5B). By this operation, the axis of the control lever 200 may gradually approach the virtual axis Pr, and will be in agreement with the virtual axis Pr at a certain timing.

The AP controller 20 may sequentially calculate the changed angle according to the motion of the virtual axis Pr. The AP controller 20 may sequentially detect the changed angle φd of the control lever 200, and detect a coincidence of the changed angle according to the motion of the virtual axis and the changed angle φd of the control lever 200.

The AP controller 20 may change the mode from the deceleration control to the manual cruise by using this detection of the coincidence as a trigger. During this change, the AP controller 20 may execute a control for setting the rotating speed according to the virtual axis Pr for the propelling force controller 50.

Therefore, similar to the change mode #1, the ship speed may not change rapidly when changed to the manual cruise, when the change mode #2 is used. Therefore, the ship body control device 10 can suitably change the mode from the automatic cruise to the manual cruise through the deceleration control.

In addition, the mode can be changed to the manual cruise also in this control, even if the control lever 200 is not resumed to the neutral position Pn. Therefore, the ship body control device 10 can resume the mode to the manual cruise at the user's desired speed different from that in the neutral state.

Figure 6:
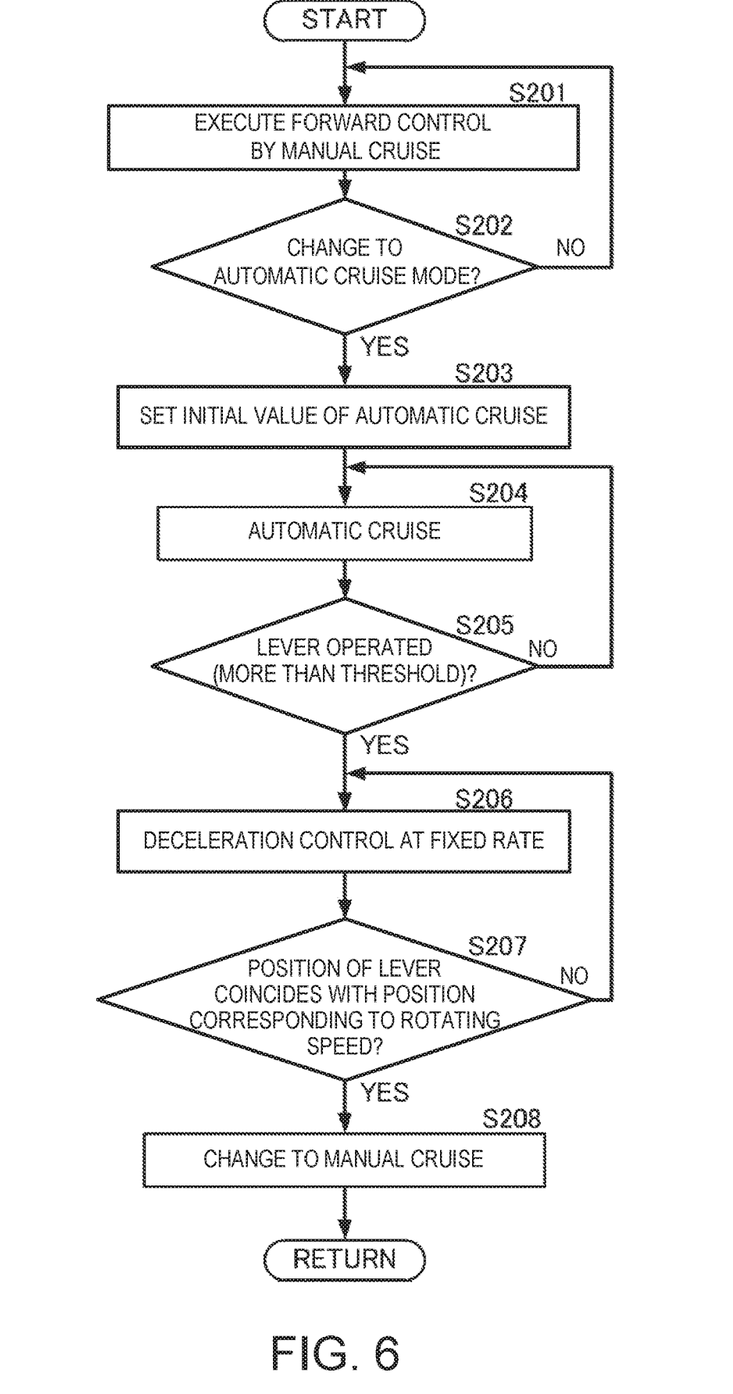
FIG. 6 is a flowchart of the second mode of the change between the automatic cruise and the manual cruise.

The above-described control may be implemented by, for example, the following method (program). FIG. 6 is a flowchart of the second mode of the change between the automatic cruise and the manual cruise. Note that, similar to the case of FIG. 4, although the following detection of the operation of the control lever 200 by the AP controller 20 uses the operating state detected by the operating state detector 201, the description thereof is omitted.

The propelling force controller 50 may execute a forward control by the manual cruise based on the operating state of the control lever 200 (Step S201).

If the AP controller 20 accepts the change to the automatic cruise by the AP interface 21 (Step S202: YES), it may then acquire the right of control of the propelling force controller 50, and perform the change to the automatic cruise. Note that, if the AP controller 20 does not accept the change to the automatic cruise (Step S202: NO), it may continue the manual cruise (Step S201).

When the AP controller 20 shifts to the automatic cruise, it may then start the automatic cruise control by using the rotating speed according to the operating state at this moment as an initial value (Step S203). Then, the AP controller 20 may issue a control instruction of the automatic cruise so that the ship cruises at a fixed ship speed (Step S204). Note that the AP controller 20 may fix the rotating speed, instead of the ship speed. Moreover, the speed and the rotating speed during the automatic cruise may arbitrarily be set, for example, by the user through the AP interface 21.

If the AP controller 20 detects the changed angle φd during the automatic cruise and detects that the changed angle φd becomes more than the threshold for starting the deceleration control (Step S205: YES), it may then shift to the deceleration control (Step S206). Here, the AP controller 20 may execute the deceleration control at a fixed rate.

If the position of the control lever 200 is fixed or the changed angle φd does not reach the threshold for starting the deceleration control (Step S205: NO), the AP controller 20 may continue the automatic cruise (Step S204).

If the position of the control lever 200 differs from the position of the axis corresponding to the rotating speed (the position of the virtual axis Pr) (Step S207: NO), the AP controller 20 may maintain the deceleration control (Step S206).

If the AP controller 20 detects that the position of the control lever 200 coincides with the position of the axis corresponding to the rotating speed (the position of the virtual axis Pr) (Step S207: YES), it may then end the deceleration control, discard the right of control of the propelling force controller 50, and change the mode to the manual cruise (Step S208). Here, the AP controller 20 may discard the right of control of the propelling force controller 50, while the engine speed is set according to the position of the virtual axis Pr.

Note that, if the AP controller 20 detects a relation between the position of the control lever 200 and the position of the axis corresponding to the rotating speed (the position of the virtual axis Pr), it may be more desirable to detect it while considering the rotating direction of the control lever 200, that is, while distinguishing between the mode change #1 and the mode change #2. Therefore, the erroneous detection when changing to the manual cruise can be reduced.

Moreover, although in the above description, the position of the control lever 200 is operated to match with the virtual axis Pr, when changing to the deceleration control, the control lever 200 may be fixed after being rotated largely, and when the virtual axis Pr reaches this position of the control lever 200, the mode may be change to the manual cruise.

Note that the above-described functions are possible to be suitably combined. The ship body control device 10 can demonstrate operation and effects according to the combinations.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A ship body control device, comprising:
a control lever having a neutral position; and
processing circuitry configured to:
execute a deceleration control from a speed of a ship body during an automatic cruise when the control lever is moved during the automatic cruise, and an amount of movement of the control lever is more than a threshold, and
change the automatic cruise to a manual cruise when a position of the control lever coincides with a position of a virtual axis corresponding to a rotating speed of an engine dropped by the deceleration control.

2. The ship body control device of claim 1, wherein the position of the control lever for changing to the manual cruise is the neutral position.

3. The ship body control device of claim 2, wherein a deceleration rate during the deceleration control is constant.

4. The ship body control device of claim 1, wherein a deceleration rate during the deceleration control is constant.

5. A method of controlling a ship body, comprising:
executing a deceleration control from a speed during an automatic cruise when a control lever is moved during the automatic cruise, and an amount of movement of the control lever is more than a threshold; and
changing the automatic cruise to a manual cruise when a position of the control lever coincides with a position of a virtual axis corresponding to a rotating speed of an engine dropped by the deceleration control.

6. The method of claim 5, wherein the position of the control lever for changing to the manual cruise is a neutral position of the control lever.

7. The method of claim 6, wherein a deceleration rate during the deceleration control is constant.

8. The method of claim 5, wherein a deceleration rate during the deceleration control is constant.

9. A non-transitory computer-readable recording medium storing a program causing processing circuitry of a ship body control device to execute processing, the processing circuitry configured to control operation of the device, the processing comprising:
when a control lever is moved during an automatic cruise and an amount of movement of the control lever is more than a threshold, executing a deceleration control from a speed during the automatic cruise; and
when a position of the control lever coincides with a position of a virtual axis corresponding to a rotating speed of an engine dropped by the deceleration control, changing the automatic cruise to a manual cruise.

10. The recording medium of claim 9, wherein the position of the control lever for changing to the manual cruise is a neutral position of the control lever.

11. The recording medium of claim 10, wherein a deceleration rate during the deceleration control is constant.

12. The recording medium of claim 9, wherein a deceleration rate during the deceleration control is constant.

* * * * *